United States Patent
Peng

(10) Patent No.: US 8,953,420 B1
(45) Date of Patent: Feb. 10, 2015

(54) METHOD AND SYSTEM FOR ALIGNING LIGHT SOURCE WITH WAVEGUIDE COUPLER

(71) Applicant: Seagate Technology LLC, Cupertino, CA (US)

(72) Inventor: Chubing Peng, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/024,307

(22) Filed: Sep. 11, 2013

(51) Int. Cl.
- *G11B 11/105* (2006.01)
- *G11B 5/48* (2006.01)
- *G11B 5/56* (2006.01)
- *G11B 13/04* (2006.01)
- *G11B 5/60* (2006.01)
- *G11B 5/00* (2006.01)

(52) U.S. Cl.
CPC ............... *G11B 5/4866* (2013.01); *G11B 5/56* (2013.01); *G11B 13/045* (2013.01); *G11B 5/6088* (2013.01); *G11B 11/105* (2013.01); *G11B 2005/0021* (2013.01)
USPC .......................... 369/13.12; 369/13.32; 360/59

(58) Field of Classification Search
CPC ............... G11B 5/6088; G11B 5/4866; G11B 2005/0021; G11B 5/4826
USPC ........ 360/59; 369/13.11, 13.24, 13.32, 13.33, 369/13.02, 13.12
See application file for complete search history.

(56) References Cited

U.S. PATENT DOCUMENTS

| | | | |
|---|---|---|---|
| 7,289,422 B2 * | 10/2007 | Rettner et al. | 369/300 |
| 8,149,654 B2 * | 4/2012 | Komura et al. | 369/13.33 |
| 8,243,561 B2 * | 8/2012 | Matsumoto | 369/13.33 |
| 8,248,895 B2 | 8/2012 | Shimazawa et al. | |
| 8,345,517 B2 | 1/2013 | Hurley et al. | |
| 8,355,299 B2 | 1/2013 | Sasaki et al. | |
| 8,393,074 B1 | 3/2013 | Takayama et al. | |
| 8,395,971 B2 | 3/2013 | Sasaki et al. | |
| 8,406,089 B2 | 3/2013 | Sasaki et al. | |
| 8,424,191 B2 | 4/2013 | Shimazawa et al. | |
| 8,456,961 B1 | 6/2013 | Wang et al. | |
| 8,477,570 B2 | 7/2013 | Arai et al. | |
| 8,477,571 B1 | 7/2013 | Zhou et al. | |
| 8,509,036 B2 | 8/2013 | Shimazawa et al. | |
| 8,531,795 B2 * | 9/2013 | Mukoh et al. | 360/59 |
| 2006/0233061 A1 * | 10/2006 | Rausch et al. | 369/13.32 |
| 2007/0159718 A1 * | 7/2007 | Kim et al. | 360/125 |
| 2009/0059411 A1 * | 3/2009 | Tanaka et al. | 360/59 |

(Continued)

FOREIGN PATENT DOCUMENTS

| | | |
|---|---|---|
| JP | 2011-198451 | 10/2011 |
| JP | 2013-004148 | 1/2013 |

*Primary Examiner* — Thomas Alunkal
(74) *Attorney, Agent, or Firm* — Hollingsworth Davis, LLC

(57) ABSTRACT

Light is guided from a light source into a waveguide coupler embedded in a slider. The light source is capable of being positioned in a cross-track, a down-track, and a vertical direction with regards to the waveguide coupler. The light emanating from an air-bearing surface of the slider is imaged using a device that generates an optical image of the air-bearing surface. A cross-track alignment position is identified as a location at which the image shows substantially the same number of photons on each side of the cross-track alignment position and has a minimum spread. A down-track alignment position is identified at which the light emanating from the air-bearing surface has maximal intensity in a down-track direction.

20 Claims, 9 Drawing Sheets

(56) References Cited

U.S. PATENT DOCUMENTS

| | | |
|---|---|---|
| 2009/0266789 A1 | 10/2009 | Shimazawa et al. |
| 2010/0232281 A1* | 9/2010 | Sekine .................... 369/112.03 |
| 2011/0157738 A1* | 6/2011 | Shimazawa et al. ........... 360/59 |
| 2011/0242697 A1* | 10/2011 | Mori et al. ...................... 360/59 |
| 2012/0092971 A1* | 4/2012 | Schreck et al. ............ 369/13.24 |
| 2013/0142478 A1 | 6/2013 | Shzewski et al. |
| 2013/0277575 A1* | 10/2013 | Peng et al. ................. 250/459.1 |

\* cited by examiner

METHOD AND SYSTEM FOR ALIGNING LIGHT SOURCE WITH WAVEGUIDE COUPLER

SUMMARY

Embodiments of a method include coupling light from a light source into a waveguide coupler embedded in a slider. The light source is capable of being positioned in a cross-track, a down-track, and a vertical direction with regards to the waveguide coupler. The method includes imaging the light emanating from an air-bearing surface of the slider using a device that generates an optical image of the air-bearing surface. The method also includes identifying a cross-track alignment position between the light source and the waveguide coupler in the cross-track direction as a location at which the image shows substantially the same number of photons on each side of the cross-track alignment position. Finally, the method includes identifying a down-track alignment position between the light source and the waveguide coupler in a down-track direction as a location at which the light emanating from the air-bearing surface has a maximal intensity in the down-track direction. In some embodiments, the method also includes performing a fine adjustment of the cross-track alignment position by identifying a fine adjustment alignment position at which a spread of the photons shown by the image along the cross-track direction is minimal.

Other embodiments are directed to a system that includes an imaging device. The imaging device is configured to generate an optical image of light emanating from an air-bearing surface of a slider. The light is emitted by a light source that is capable of being positioned in a cross-track, a down-track, and a vertical direction with respect to a waveguide coupler embedded in the slider. The system also includes an analyzer configured to determine an alignment position of the light source relative to the waveguide coupler in the cross-track direction as a location at which the image shows substantially the same number of photons on each side of the cross-track alignment position. The analyzer is further configured to determine an alignment position between the light source and the waveguide coupler in a down-track direction as a location at which the light emanating from the air-bearing surface has a maximum intensity in the down-track direction.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein:

FIGS. 5A'-5D' are near-field intensity profiles of FIGS. 5A-5D of an example embodiment.

FIGS. 7A'-7C' are near-field intensity profiles of FIGS. 7A-7C for an example embodiment.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
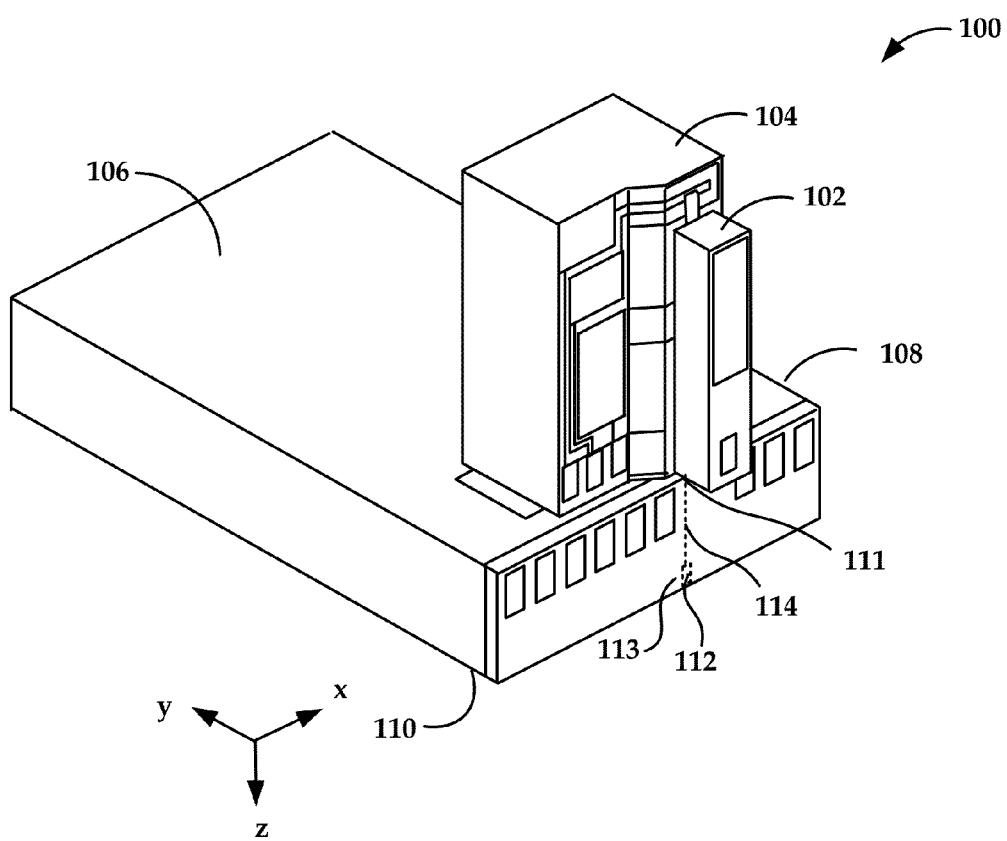
FIG. 1 is a perspective view showing a HAMR slider assembly according to an example embodiment.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure generally relates to magnetic recording devices used for data storage. Methods and systems are described herein that can facilitate assembly of very small scale optical devices. These methods and systems can be used, for example, for assembling heat-assisted magnetic recording (HAMR) devices, which can also be described as thermal-assisted magnetic recording (TAMR) and energy-assisted magnetic recording (EAMR). Generally, a HAMR device uses a light source, such as a laser diode, to heat a magnetic medium while it is storing the data.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot", of the magnetic medium is locally heated to its increase its coercivity, thereby allowing magnetic orientation of the medium to be changed at the hot spot while being written to by a transducer (e.g., magnetic write pole).

A HAMR read/write head, sometimes referred to as a slider, includes magnetic read and write transducers similar to those on current hard drives. For example, data can be read by a magneto-resistive sensor that detects magnetic fluctuations of the moving medium. Data can be written to the magnetic medium by a write coil that is magnetically coupled to a write pole. A HAMR slider can also include a light source, such as a laser diode, and an optical delivery path through the slider that delivers the energy to the surface of the medium. In some configurations, the light source can be a separately-manufactured device that can be attached to the slider. In these configurations, the light source can be attached to the top of the slider (laser-on-slider or LOS) and guided from the light source into the slider using a channel waveguide input coupler.

During the attachment procedure, it is desirable to precisely align the light source to the input coupler during assembly to minimize optical transmission losses in the optical delivery path. This alignment can be challenging due to, among other things, the small size of the laser diode and slider, which can have dimensions on the order of 500 µm or smaller when the light source is a laser diode. Due to imperfect mode mismatch between the laser diode and the channel waveguide input coupler, only one portion of light can be coupled into the waveguide input coupler. The rest of the light will become radiation modes, referred to as "stray light". These radiation modes can propagate in the slider and in the surrounding structures and a portion of this light still reaches the opposite side of the slider (i.e., the air-bearing surface or ABS).

FIG. 1 is a perspective view showing HAMR slider assembly 100 according to an example embodiment. In this example, laser diode 102 is mounted to submount 104, and submount 104 is attached to top surface 106 of slider body 108. Laser diode 102 in this example is an edge-emitting laser that emits light in the negative y-direction. Submount 104 can orient the laser output in a desired direction allowing it to be directly guided into waveguide input coupler 111 of channel waveguide 114 within slider body 108. Channel waveguide 114 directs the laser output energy so that it is emitted from media-facing, air-bearing surface 110 of slider body 108, thereby heating a proximate magnetic medium (not shown) that moves underneath slider assembly 100.

Media-facing surface (air-bearing surface) 110 can be configured as an air-bearing surface (ABS) that maintains a cushion of air between slider body 108 and the recording medium. Transducer region 113 of slider body 108 includes at least a write transducer that generates a magnetic field and an optical transducer that receives energy from laser diode 102 and directs the energy to the recording medium. The optical transducer can include a near-field transducer (NFT) 112 that directs the energy via surface plasmon resonance. Optical channel waveguide 114 includes optical components (e.g., waveguides, mirrors, couplers, decouplers, etc.) that are integrated in slider body 108 and facilitate delivering energy from laser diode 102 to NFT 112.

In the illustrated slider assembly 100, laser diode 102, submount 104 and slider body 108 can be formed using integrated circuit/optics manufacturing techniques. For example, the components can be formed by (among other things) depositing layers of material on a wafer substrate, creating features in the layers using photolithography, chemical/mechanical polishing, and dividing the wafer into individual components. Afterwards, laser diode 102 can be bonded or attached (e.g., soldered) to submount 104 and submount 104 can then be attached to slider body 108. These components can be attached by bonding features such as a solder pads, bond lines, bond layers, etc. Attachment/bonding can occur in another order, e.g., submount 104 can be bonded to slider body 108 before laser diode 102 is attached. In either case, it can be desirable to precisely align the output of laser diode 102 with the optical waveguide 114 to minimize optical losses. The alignment between components described herein can occur, for example, before or during reflow of bonding features.

Light from the laser diode that is guided into the channel waveguide can be routed by the channel waveguide and, if present, additional optical elements such as mirrors, into the center of the slider and can be focused by a solid immersion mirror (SIM). If the laser diode is not properly aligned with the waveguide input coupler, then less light can reach the solid immersion mirror and, ultimately, any recording media at the air-bearing surface of the HAMR recording device. Laser diode—waveguide input coupler alignment can be carried out by maximizing light transmission through the SIM if an offset between the SIM and the waveguide input coupler is large (for example, 200 µm), stray light propagating through the slider will not be collected by an objective of high numerical aperture focused at the SIM center.

For straight-through light delivery, such as in an LOS configuration, stray light and guided modes can be mixed at the air-bearing surface. The SIM can have a high numerical aperture, causing only a fraction of the light reflected from the SIM sidewall to propagate to the far-field due to total internal reflection. Consequently, in the far-field, before the laser diode is aligned to an input coupler, such as a waveguide input coupler, any detector used to align the laser diode and the waveguide input coupler cannot rely on far-field transmission feedback.

Embodiments of methods, systems, and apparatuses for alignment of laser diodes to channel waveguide input couplers for laser-on-slider light delivery in a HAMR device are based upon imaging light at the air-bearing surface. In some embodiments, the imaging can be accomplished using a charge-coupled device (CCD) or a photodiode. In some embodiments, a multi-mode fiber may be used to deliver the light onto the photodiode. The methods include coupling light from a light source, such as a laser diode, into a waveguide input coupler embedded in a slider. The light source can be capable of being positioned in a cross-track, a down-track, and a vertical direction with regards to the waveguide coupler and referenced to recording media at the air-bearing surface. Generally, the term "vertical" in this disclosure is intended to describe a direction normal to the respective interface surfaces of two components, such as the light source 210 and slider 201 shown in the embodiments shown in FIGS. 2A and 2B. The use of the term "vertical" is not intended to limit any relative or absolute orientation of the components being positioned, e.g., relative to the earth's surface. Light emanating from the air-bearing surface can be imaged using a device that can generate an optical image of the air-bearing surface. Such devices can include, for example, charge-coupled devices (CCDs), detector array, or a complementary metal-oxide-semiconductor (CMOS) detector.

Figure 2A:
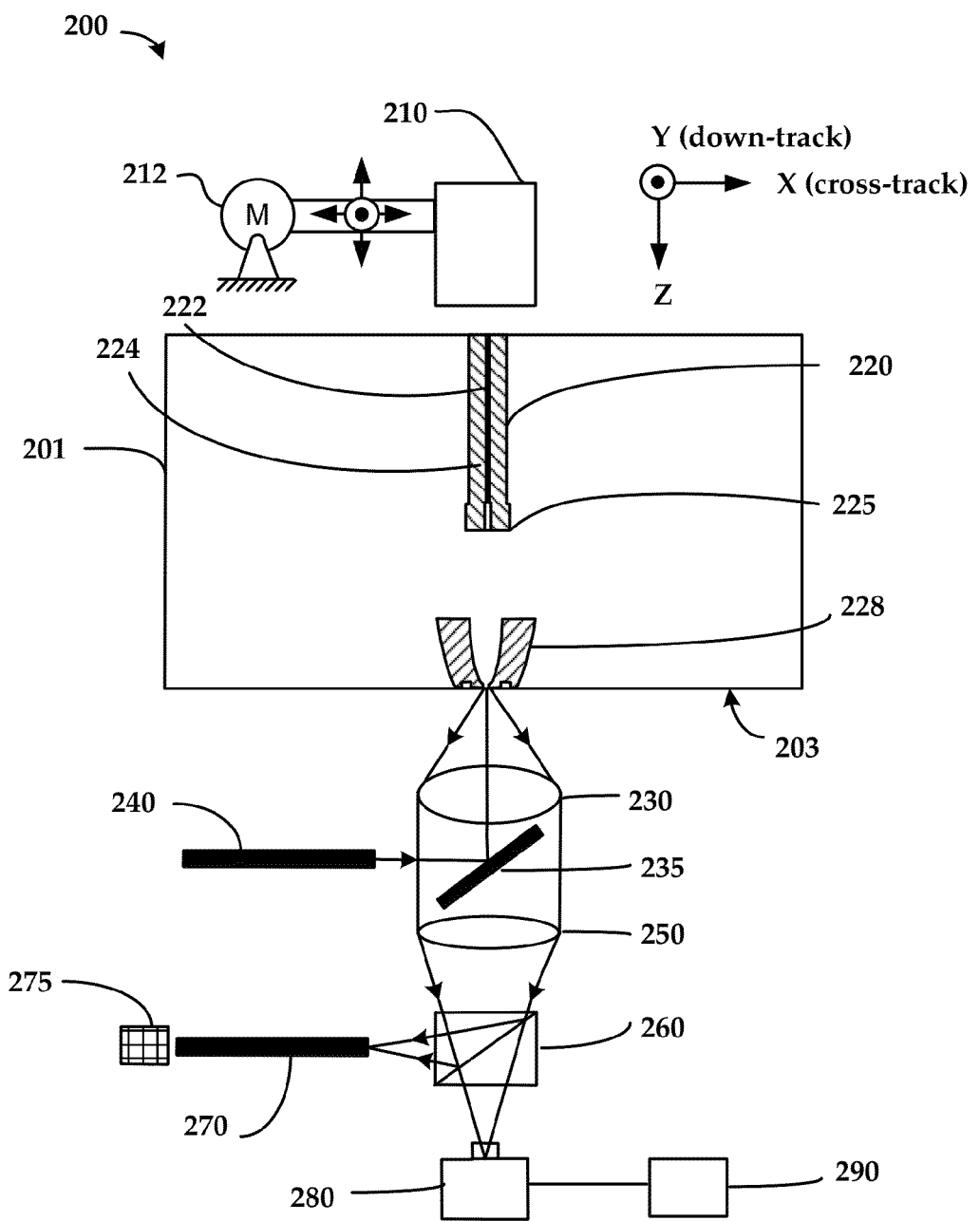
FIG. 2A is a diagram of an optical feedback system for diode-input waveguide coupler alignment of an example embodiment.
Figure 2B:
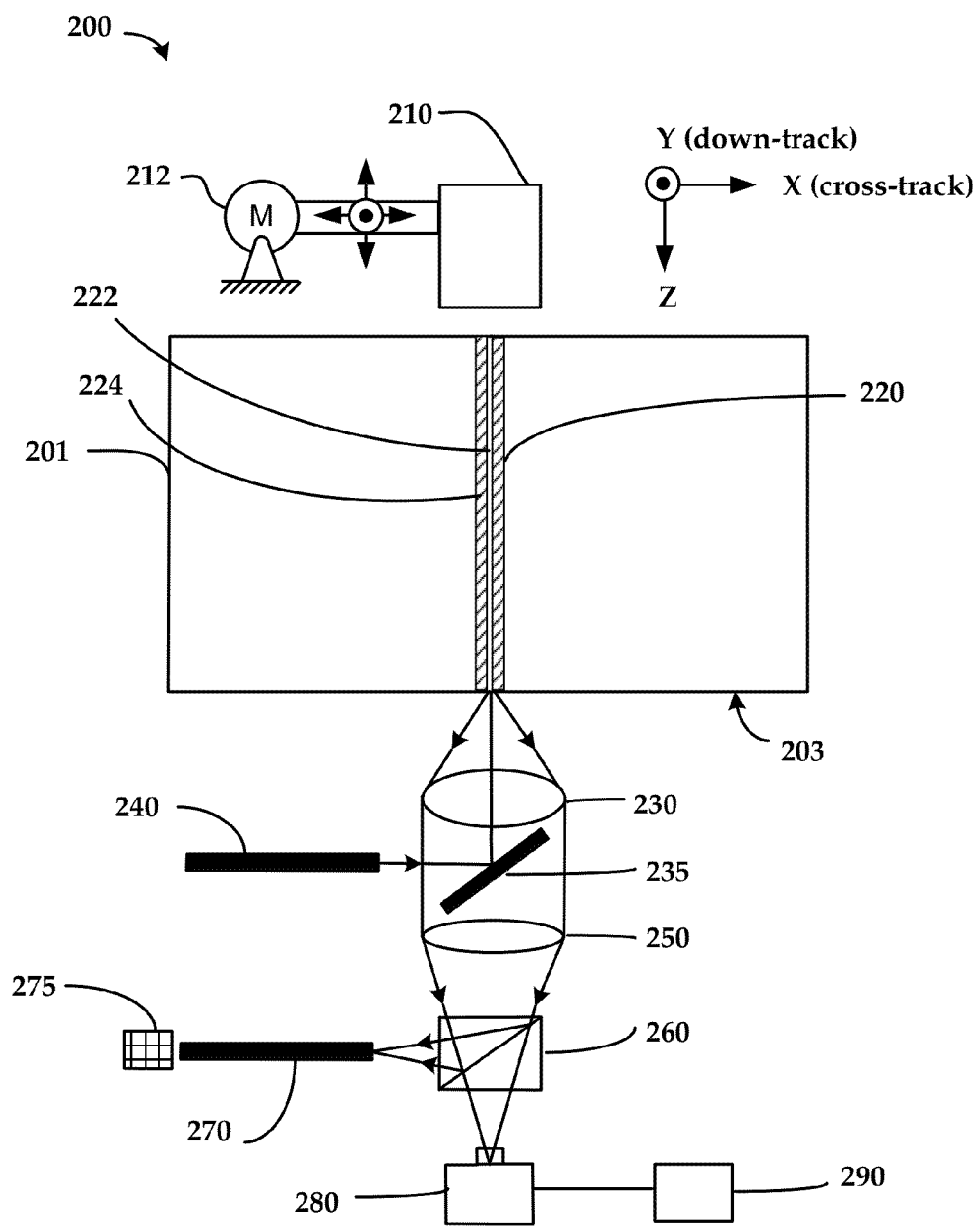
FIG. 2B is a diagram of an optical feedback system for diode-input waveguide coupler alignment of another example embodiment.

FIG. 2A is a diagram of an optical feedback system according to an example embodiment. Optical feedback system 200 can be used for alignment of straight-through light delivery components (e.g., laser-on-slider assembly). Optical feedback system 200 can operate on a light source 210 which, in some embodiments, can be an edge-emitting laser diode. Light source 210 can be moved in a cross-track (x), a down-track (y), or a vertical (z) direction as shown in FIGS. 2A and 2B. In some embodiments, the optical feedback system 200 can include a micro-translational stage (represented schematically as motor-actuator 212) moveable in three directions that supports light source 210, slider 201, or both can be supported on a translation stage moveable in three directions. Optical feedback system 200 can include slider 201 that has an embedded waveguide input coupler 220. Waveguide input coupler 220 can include beam expander 225 as shown in the embodiment shown in FIG. 2A. Light can be guided from light source 210 into waveguide input coupler 220 which, in turn, can deliver light to solid immersion mirror 228. Solid immersion mirror 228 can be etched into slider 201 to condense the beam of light exiting channel waveguide input coupler 220 through beam expander 225 in the direction parallel to the waveguide plane (x-z plane, for example). Normal to the waveguide plane, light can be confined by the core of waveguide input coupler 220. The light can be guided from light source 210 into waveguide input coupler 220 by, for example, butt coupling.

All of the optical components in slider 201 can be built into the slider during fabrication of the slider. Thus, waveguide input coupler 220, beam expander 225, and solid immersion mirror 228 can all be integrated optics devices. Light that is captured by solid immersion mirror 228 can emerge from slider 201 at air-bearing surface 203 and can diverge at that point as shown by the diverging arrows emerging from solid immersion mirror 228. Objective 230 can collimate the divergent light followed by imaging lens 250 which can focus the image obtained from air-bearing surface 203 through beam splitter 260 into CCD camera 280. CCD camera 280 can feed digital information to computer/processor 290 for image processing. Objective 230 can function as a light collector. Light exiting from the solid immersion mirror 228 can be collected by an objective of high numerical aperture. In the embodiment shown in FIG. 2A, for example, objective 230 can be a dry objective that can have a numerical aperture of 0.55. The combination of objective 230 and imaging lens 250 can image light at air-bearing surface 203 and can transmit the transmitted light to an imaging device such as CCD camera 280.

Beam splitter 260 can divert some of the focused light from imaging lens 250 to an additional or alternative detection device. In the embodiments exemplified in FIGS. 2A and 2B, the light is diverted through multi-mode fiber 270 and into photodetector 275. Multi-mode fiber 270 can be used to reject some leaky light exiting the air-bearing surface 203. Transmitted light can also be evaluated or analyzed by integrating the photons from each CCD pixel. To aid focusing, light from fiber white light source 240 can be injected through dichroic beam splitter 235 into the light path between objective 230 and imaging lens 250.

Waveguide input coupler 220 can include waveguide core 222 that is surrounded by cladding 224. There can be a high contrast in the index of refraction between the materials that make up waveguide core 222 and cladding 224. Waveguide core 222 can be fabricated with high refractive index materials such as, for example, $Ta_2O_5$, $SiN_x$, $TiO_x$, and ZnS. Cladding material can be fabricated with low refractive index material (lower, for example, than the material used for the cladding). Examples of cladding material can include, for example, $Al_2O_3$, $SiO_2$, $SiON_x$, $Y_2O_3$, $Nb_2O_3$, and $MgO_2$.

FIG. 2B is a diagram of an optical feedback system according to another example embodiment. In FIG. 2B, waveguide input coupler 220 can guide light from light source (laser diode) 210 through slider 201 where it can exit slider 201 and be collimated by imaging lens 250. In this example embodiment there is no solid immersion mirror. The other optical components of the example embodiment shown in FIG. 2B are the same as that shown in the embodiment of FIG. 2A.

Some embodiments of the disclosed method include coupling light from a light source into a waveguide coupler embedded in a slider and imaging the light emanating from an air-bearing surface of the slider using a device that generated an optical image of the air-bearing surface as described above and illustrated in FIGS. 2A and 2B. These embodiments also include identifying a cross-track direction (x-direction in FIGS. 2A and 2B) as a location (x=0 location) at which the optical image shows substantially the same number of photons on each side of the cross-track alignment position.

Figure 3:
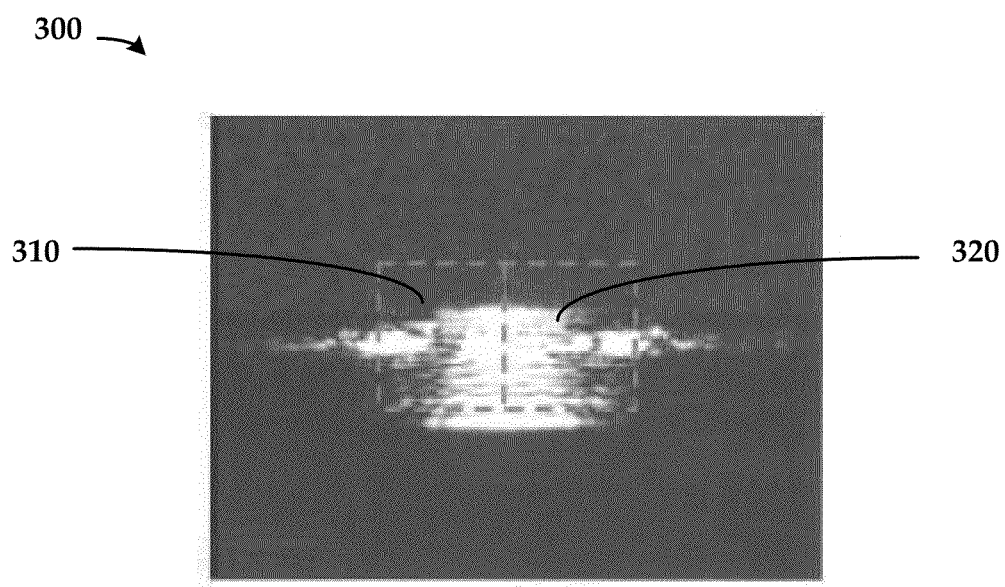
FIG. 3 is a micro-image on a charge-coupled device (CCD) when a diode that is 20 μm from the top surface of a slider in the z-direction of an example embodiment.

FIG. 3 illustrates micro-image 300 on a charge-coupled device (CCD) for a laser diode that is 20 μm from the top surface of a slider in the z-direction of an example embodiment. A left dashed box 310 and a right dashed box 320 are shown centered at the SIM opening (x=0). Photons from the left dashed box 310 are subtracted from the right dashed box 320. The cross-track alignment position of the laser diode to the waveguide input coupler can then be adjusted until the substantially the same number of photons are detected in left dashed box 310 as are detected in right dashed box 320 as well as minimizing light spread along the cross-track direction. FIG. 3 shows an image the laser diode is at the x=0 position of alignment.

Figure 4A:
FIG. 4A is a micro-image on a CCD when a diode is 3 μm away from the top surface of a slider in the z-direction of an example embodiment.
Figure 4B:
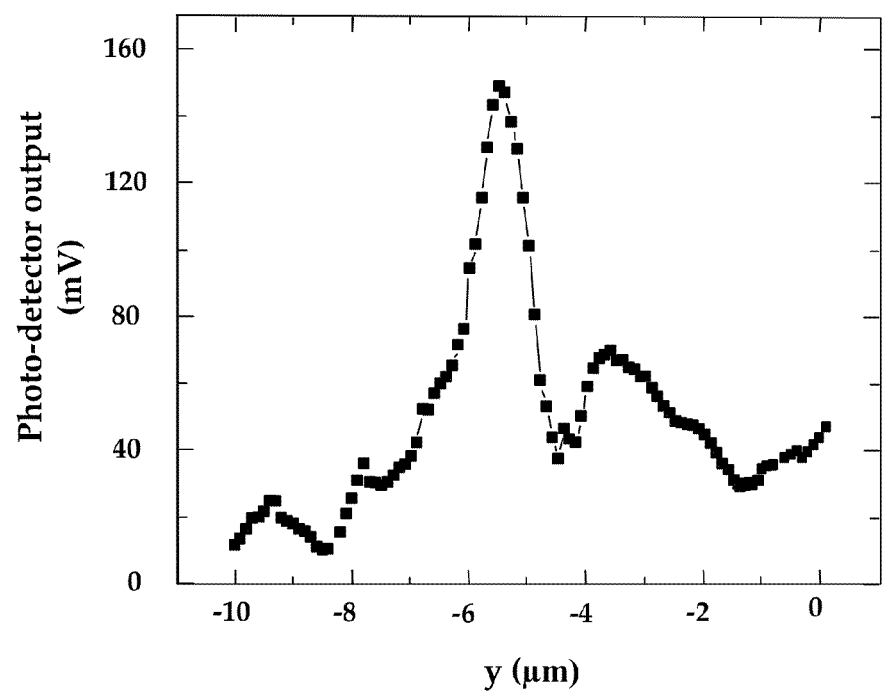
FIG. 4B is a graph of the signal from a photodetector as a function of an example embodiment of diode position along the y-axis.

Additionally, these embodiments also can include identifying a down-track alignment position (y-direction in FIGS. 2A and 2B) as a location at which the light emanating from the air-bearing surface has an optimal intensity in the down-track direction. A laser diode for down-track alignment can be, for example, from about 2 μm to about 10 μm away from the waveguide input coupler embedded in the slider in the vertical direction (z-direction). Down-track (y-direction) positioning can be carried out by maximizing a digital signal from photons received in a box centered at the SIM opening and at the waveguide core as shown in FIGS. 4A and 4B. The digital signal can be obtained using a CCD camera or a photodetector with con-focal detection (con-focal detector) as explained above.

FIG. 4A is a micro-image 400 on a CCD when a diode is 3 μm away from the top surface of a slider in the z-direction of an example embodiment. FIG. 4B is a graph of the signal from a photodetector as a function of an example embodiment of diode position along the y-axis. The micro-image and the graph can identify a down-track alignment position between the light source and the waveguide coupler that maximizes the digital signal from a detector. The position of the laser diode relative to the waveguide input coupler can then be adjusted the down-track direction (y-direction) until the signal is maximized. In FIG. 4B, for example, the maximum signal occurs at an arbitrary position approximately −4.5 μm from the edge of the signal.

Figure 5A:
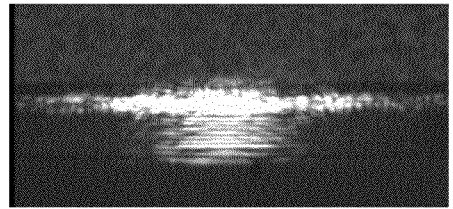
FIGS. 5A-D are micro-images on a CCD of diodes of an example embodiment that are at a position of 1 μm, 0 μm, −1 μm, and −2 μm respectively along the x-axis.
Figure 5A:
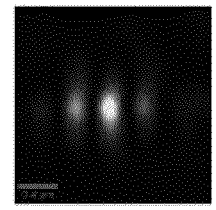
Figure 5B:
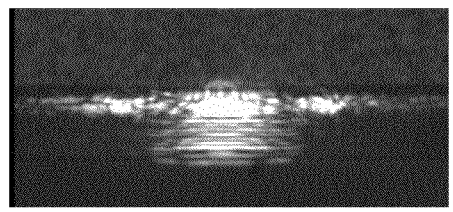
Figure 5B:
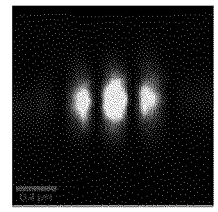
Figure 5C:
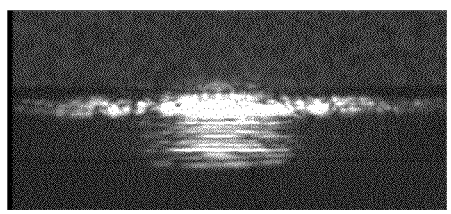
Figure 5C:
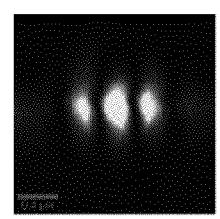
Figure 5D:
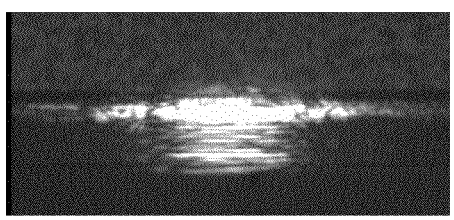
Figure 5D:
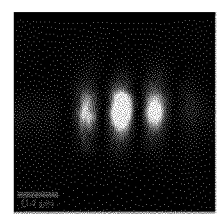

If desired, fine-tuning of the alignment can be done by pattern matching of the light image on, for example, the CCD detector. The pattern for matching can be created by minimizing the spread of the central beam in the cross-track direction (x-direction) and balancing the light intensity centered at the SIM using the signal as shown in FIG. 4A. Such a pattern is shown by observing and minimizing the spread of photons while keeping light intensity symmetry at the SIM center in, for example, box 410 of FIG. 4A. The alignment can be verified by measuring the near-field intensity profile using a scanning near-field optical microscope (SNOM) which scans a cantilever with an aperture on the air-bearing surface of the slider. FIGS. 5A-D are micro-images on a CCD of diodes of an example embodiment that are at a position of 1 μm, 0 μm, −1 μm, and −2 μm respectively along the x-axis from the center of the SIM aperture at the air-bearing surface of the embodied slider. The x=0 μm position is such that the laser diode is centered at the waveguide input coupler based upon the above alignment procedures. FIGS. 5A'-5D' are corresponding near-field intensity profiles of FIGS. 5A-5D. The data on CCD images show that the central beam has minimal spread along the x-direction at x=0 (FIG. 5B) and that the central beam spreads quickly as the laser diode is moved away from the x=0 location—even at 1 μm away from x=0. In some embodiments, data from CCD images that show minimal spread along the x-direction at x=0 (for example, as shown in FIG. 5B) can be digitally stored and then used for cross-track alignment of other devices.

Figure 6:
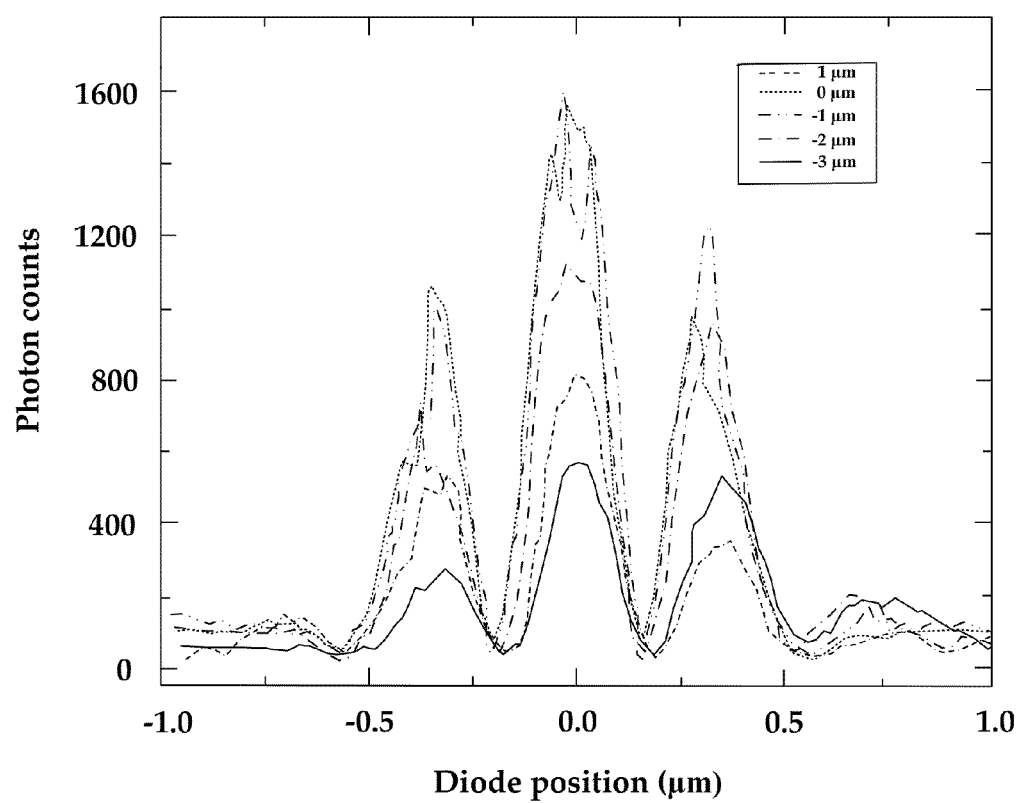
FIG. 6 is a graph of peak photo-counts as a function of diode position along the x-axis of an example embodiment.

FIGS. 5A'-D' show a drop off of light intensity in the near-field as the diode is moved from x=0 in the x-direction. It can be observed that the maximum intensity is shown in FIG. 5B'. FIG. 6 is a lineplot of the near-field intensity profile as a function of diode position along the x-axis for x=+1 μm, 0 μm, −1 μm, −2 μm, and −3 μm. A large drop off in intensity can occur with even small misalignments of the laser diode with the waveguide input coupler.

Figure 7A:
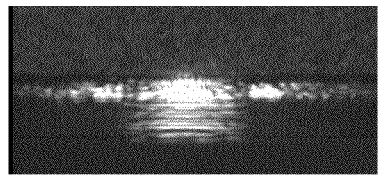
FIGS. 7A-7C are micro-images on a CCD of diodes that are at a position of 0 μm, 1 μm, and 2 μm along the x-axis of an example embodiment.
Figure 7A:
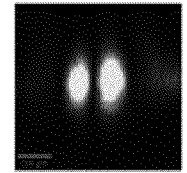
Figure 7B:
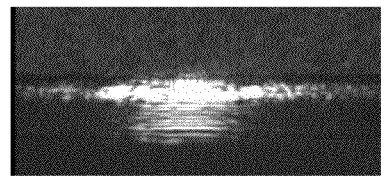
Figure 7B:
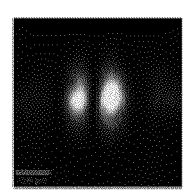
Figure 7C:
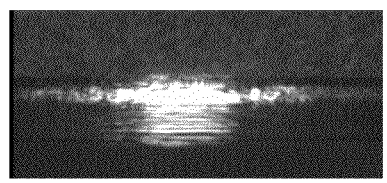
Figure 7C:
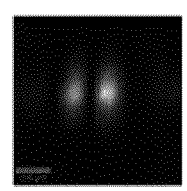
Figure 8:
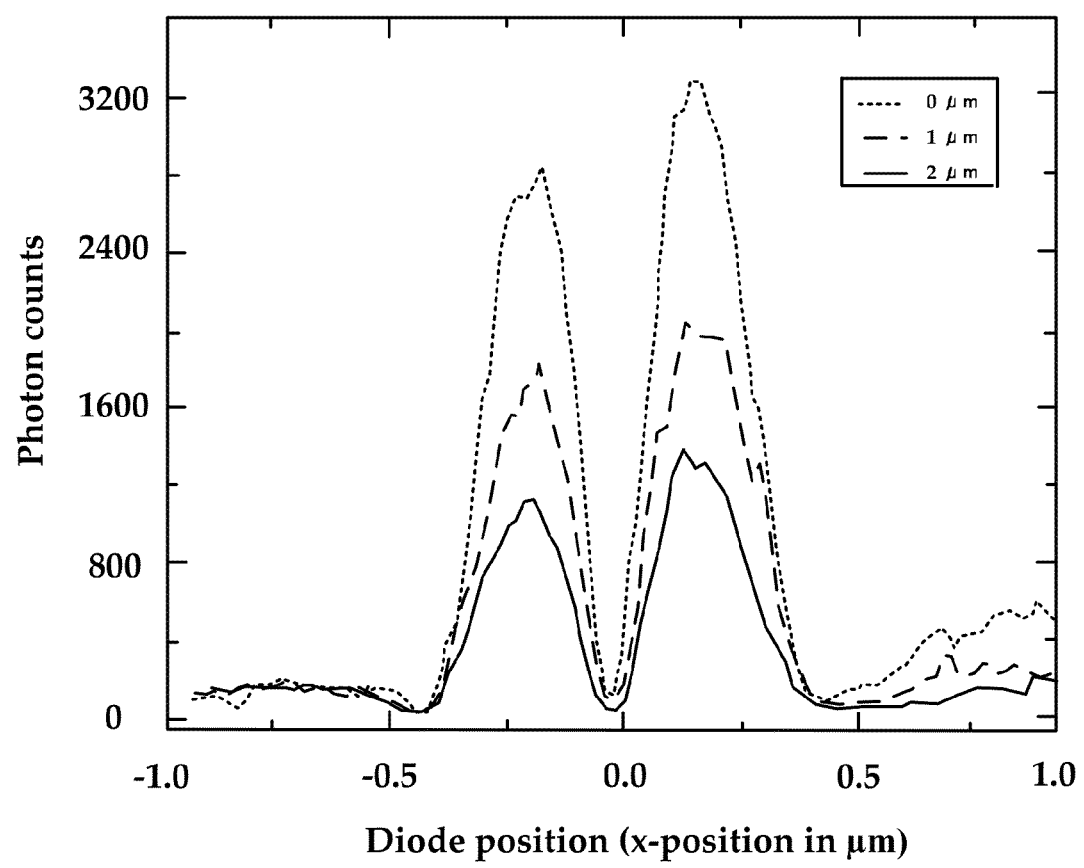
FIG. 8 is a graph of near-field intensity of the example embodiment shown in FIGS. 7A-7C.

A SIM with two asymmetric mirror sidewalls such that there is a π phase difference in the reflected rays from the two sidewalls can be built into the slider for near-field transducer excitation. Two focused spots are expected in the near-field intensity profile using a slider that includes a SIM with asymmetric sidewalls. FIGS. 7A-7C are micro-images on a CCD of diodes that are at a position of 0 μm, 1 μm, and 2 μm along the x-axis using a slider that includes an asymmetric SIM. FIGS. 7A'-7C' are the corresponding near-field intensity profiles of FIGS. 7A-7C. FIG. 8 is a lineplot of the near-field intensity of the example embodiment shown in FIGS. 7A-7C. FIG. 8 shows maximum coupling efficiency, as evidenced by maximum signal (optimal intensity), of the two peaks when aligned.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method, comprising:
   coupling light from a light source into a waveguide embedded in a slider, the light source capable of being positioned in a cross-track, down-track, and vertical direction with regards to the waveguide;
   imaging the light emanating from the waveguide at a single location of an air-bearing surface of the slider using a device comprising an objective lens of high numeric aperture that collimates the light through a dichroic beam splitter to an imaging lens that focuses the light to an imaging device that generates an optical image of the air-bearing surface, wherein the beam splitter diverts a portion of the light to a photodetector, and wherein output from a white light source is injected through the dichroic beam splitter to aid in focusing;
   identifying a cross-track alignment position between the light source and the waveguide coupler as a cross-track location at which the optical image shows substantially the same number of photons on each side of the cross-track alignment position and minimum light spread along a cross-track direction; and
   identifying, via the photodetector, a down-track alignment position between the light source and the waveguide in a down-track location at which the light emanating from the air-bearing surface has an optimal intensity in a down-track direction.

2. A method according to claim 1, further comprising performing a fine adjustment of the cross-track alignment position by identifying a fine adjustment alignment position at which a spread of the photons shown by the optical image along the cross-track direction is minimal.

3. A method according to claim 1, wherein the light source comprises a laser diode.

4. A method according to claim 3, wherein the laser diode comprises an edge-emitting laser diode.

5. A method according to claim 1, wherein the device that generates the optical image of the air-bearing surface comprises a charge-coupled device or a con-focal detector.

6. A method according to claim 1, wherein identifying the cross-track alignment position of between the light source and the waveguide coupler comprises subtracting using a digital signal from the device that generates the optical image of the air-bearing surface, and digitally subtracting the number of photons of one side of the cross-track alignment position from another side of the cross-track alignment position.

7. A method according to claim 1, wherein identifying the down-track alignment position between the light source and the waveguide coupler in the down-track direction comprises using a digital signal from the device that generates the optical image of the air-bearing surface, and maximizing the digital signal when adjusting the down-track alignment position.

8. A method according to claim 1, wherein identifying the cross-track alignment position and identifying the down-track alignment position are performed in that order.

9. A system comprising:
   an imaging device configured to generate an optical image of light emanating from an air-bearing surface of a slider, the light emitted by a light source that is capable of being positioned in a cross-track, down-track, and vertical direction with respect to a waveguide coupler embedded in the slider, the light focused on the imaging device by a focusing device external to the slider, the focusing device comprising a white light source; and
   an analyzer configured to determine a first alignment position of the light source relative to the waveguide coupler as a cross-track location at which the optical image shows substantially the same number of photons on each side of the first alignment position, the analyzer further configured to determine a second alignment position between the light source and the waveguide coupler as a down-track location at which the light emanating from the air-bearing surface has an optimal intensity in the down-track direction.

10. A system according to claim 9, wherein the slider comprises an asymmetric solid immersion mirror.

11. A system according to claim 10, wherein the light source, the slider, or both are supported on a translation stage.

12. A system according to claim 11, wherein the translation stage is moveable in three directions.

13. A method, comprising:
   coupling light from a light source into a waveguide embedded in a slider, the light source capable of being positioned in a cross-track, down-track, and vertical direction with regards to the waveguide;
   imaging the light emanating from the waveguide at a single location of an air-bearing surface of the slider using a focusing device external to the slider that generates an optical image of the air-bearing surface, wherein output from a white light source is injected into the focusing device to aid in focusing;

identifying a cross-track alignment position between the light source and the waveguide as a cross-track location at which the optical image shows substantially the same number of photons on each side of the cross-track alignment position and minimum light spread along a cross-track direction; and identifying a down-track alignment position between the light source and the waveguide in a down-track location at which the light emanating from the air-bearing surface has an optimal intensity in a down-track direction.

14. A method according to claim 13, further comprising performing a fine adjustment of the cross-track alignment position by identifying a fine adjustment alignment position at which a spread of the photons shown by the optical image along the cross-track direction is minimal.

15. A method according to claim 13, wherein the light source comprises a laser diode.

16. A method according to claim 15, wherein the laser diode comprises an edge-emitting laser diode.

17. A method according to claim 13, wherein the device that generates the optical image of the air-bearing surface comprises a charge-coupled device or a con-focal detector.

18. A method according to claim 13, wherein identifying the cross-track alignment position of between the light source and the waveguide coupler comprises subtracting using a digital signal from the device that generates the optical image of the air-bearing surface, and digitally subtracting the number of photons of one side of the cross-track alignment position from another side of the cross-track alignment position.

19. A method according to claim 13, wherein identifying the down-track alignment position between the light source and the waveguide coupler in the down-track direction comprises using a digital signal from the device that generates the optical image of the air-bearing surface, and maximizing the digital signal when adjusting the down-track alignment position.

20. A method according to claim 13, wherein identifying the cross-track alignment position and identifying the down-track alignment position are performed in that order.

* * * * *